United States Patent
Mochizuki

(10) Patent No.: US 6,580,764 B1
(45) Date of Patent: Jun. 17, 2003

(54) CHANNEL CHARACTERISTICS ESTIMATION APPARATUS

(75) Inventor: Takashi Mochizuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/425,893

(22) Filed: Oct. 25, 1999

(30) Foreign Application Priority Data

Nov. 2, 1998 (JP) .............................. 10-311930

(51) Int. Cl.$^7$ .............................. H04B 1/69; H04B 1/707
(52) U.S. Cl. .................... 375/316; 375/134; 375/145; 375/149; 375/150
(58) Field of Search ................... 375/316, 150, 375/134, 145, 149

(56) References Cited

U.S. PATENT DOCUMENTS

| | | | |
|---|---|---|---|
| 5,623,511 A | 4/1997 | Bar-David et al. | 375/207 |
| 5,712,877 A | 1/1998 | Ho et al. | 375/284 |
| 5,838,797 A | * 11/1998 | Iwasaki | 380/49 |
| 6,064,690 A | * 5/2000 | Zhou et al. | 375/207 |
| 6,363,106 B1 | * 3/2002 | Popovic et al. | 375/150 |

FOREIGN PATENT DOCUMENTS

JP      7-231286      8/1995

OTHER PUBLICATIONS

The Transaction of The Institute of Electronics, Information and Communication Engineers B–11, vol. J77–B–11, No. 11, pp. 628–640 (Nov. 1994).
The Technical Report of the Institute of Electronics, Information and Communication Engineers, RCS97–163 (Nov. 1997).

* cited by examiner

Primary Examiner—Stephen Chin
Assistant Examiner—Sam Ahn
(74) Attorney, Agent, or Firm—Whitham, Curtis & Christofferson, P.C.

(57) ABSTRACT

To estimate the channel characteristics on the basis of the time differences of the sample points, and to reduce memory capacity and processing steps required for the estimation. The first adder sums up detected pilot signals slot by slot, while the second adder sums up ((sample number n)×pilot signals) slot by slot. The output from the first adder multiplied by (4N−2)/(N(N+1)) and the output from the second adder multiplied by (−6)/(N(N+1)) are added in the third adder. The output from the first adder multiplied by (−6)/(N(N+1)) and the output from the second adder multiplied by (12)/(N(N−1)(N+1)) are added in the forth adder. The output from the forth adder is filtered by LPF to obtain output b (k) which is an inclination value of the channel characteristics of a slot, while the output from the third adder is compensated by FLT to obtain a (k) which is a bias value of the channel characteristics.

7 Claims, 6 Drawing Sheets

F I G.2
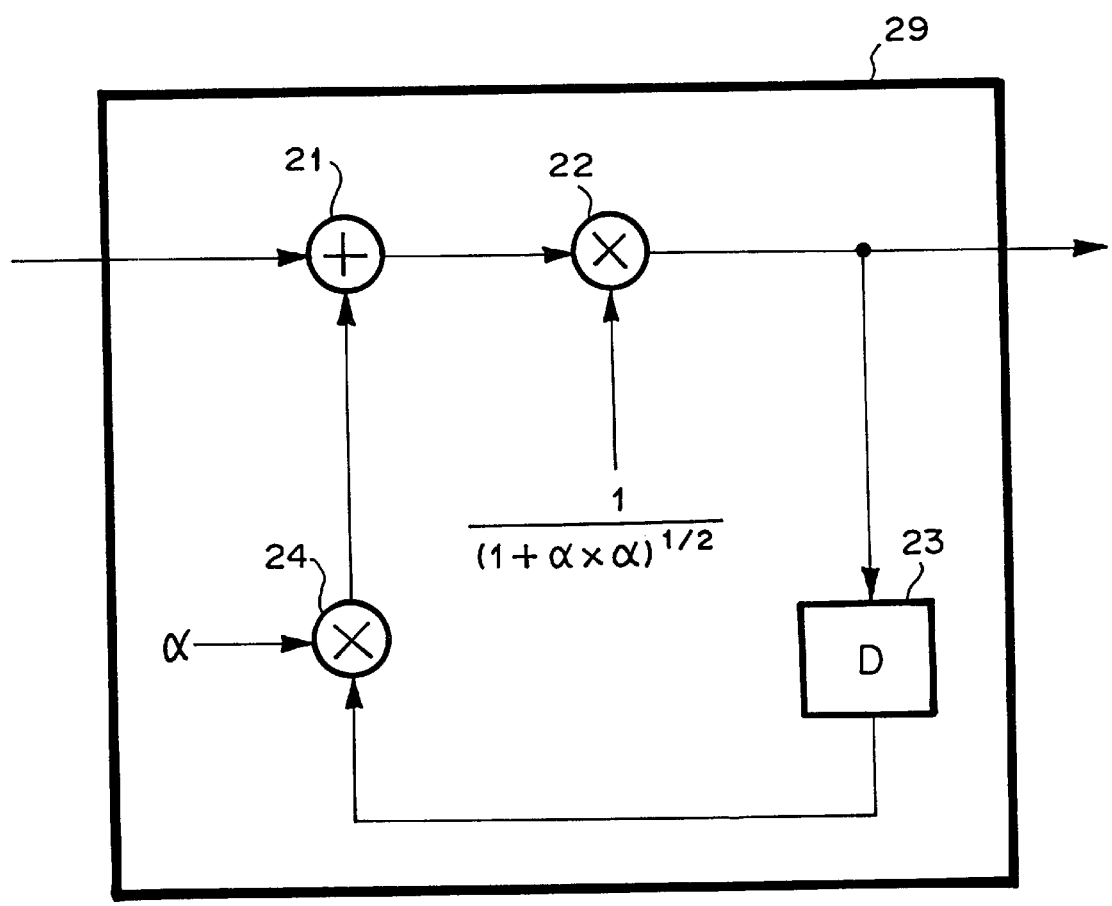

CHANNEL CHARACTERISTICS ESTIMATION APPARATUS

BACKGROUND OF THE INVENTION

1. Technical Field of the Invention

The present invention relates to an apparatus for estimating characteristics of transmission channels. The channel characteristics estimation apparatus of the present invention is suitable for receivers in a digital mobile communication system such as spread-spectrum CDMA.

2. Description of the Prior Art

Conventionally, the characteristics of transmission channels are estimated on the basis of pilot signals with prescribed patterns, in order to compensate distortions in the received data signals.

Such pilot signals are carried by the quadrature component, while the transmission data are carried by the in-phase component, as shown in FIG. 5. The receiver estimates the fluctuations in amplitudes and phases of the pilot signals in order to compensate the distortions in the received data.

The transmission data as shown in FIG. 5 is contained in a slot with a certain time interval. The pilot signal is also contained in the slot. Further, other signals are often inserted in a time slot which contains the pilot signal.

A conventional receiver is shown in FIG. 4, which receives the above-mentioned data and pilot signals.

The data and pilot signals received by antenna 1 are detected by matched filters 3 and 4, respectively. Each matched filter detects a correlation with each own pseudo-random sequence.

Channel characteristics estimation circuit 6 estimates characteristics of transmission channels on the basis of the output from matched filter 4, while delay circuit 5 delays the output from matched filter 3 by the time period which is required for the signal processing in channel characteristic estimation circuit 6.

Multiplier 7 compensates the transmission distortion by multiplying the output from delay circuit 5 by the output from channel characteristics estimation circuit 6. Further, a plurality of multipliers 7 for different timings are prepared, and the outputs from the plurality of multipliers 7 are added by adder 8. Here, each of multipliers are connected with matched filters 3 and 4, channel characteristics estimation circuit 6, and delay circuit 5.

An example of formula for estimating the channel characteristics is described in Reference 1 (THE TRANSACTION OF THE INSTITUTE OF ELECTRONICS, INFORMATION AND COMMUNICATION ENGINEERS B-11, Vol. J77-B-11, No. 11, pp. 628–640 (1994. November)).

The formula in Reference 1 approximates the channel characteristics in a linear form, by using a non-recursive filter on the basis of Ne samples of detected pilot signals X (nTb).

The formula 1 for obtaining tap coefficients Ci in Reference 1 is $$C_i = \frac{-6i + 4Ne - 2}{Ne(Ne+1)} \quad (i = 0, \ldots, Ne-1),$$

wherein Ne is a number of taps and Ci is a tap coefficient. Here, Ne is 150, and every sample has the same weight.

Another example of formula for estimating the channel characteristics is described in Reference 2 (THE TECHNICAL REPORT OF THE INSTITUTE OF ELECTRONICS, INFORMATION AND COMMUNICATION ENGINEERS, RCS97-163 (1997. November)).

Formula 2 for estimating the characteristics of a transmission channel in Reference 2 is $$\tilde{\xi}_l(n) = \frac{1}{2L} \sum_{m=-L}^{L-1} \beta_m \hat{h}_l(n+m),$$

wherein 2L is a number of employed symbols, $\beta_m$ is m-th weight coefficient, $\hat{h}_l(n+m)$ is an estimated complex impulse response of $(n+m)^{th}$ symbol in $l^{th}$ branch, and $\tilde{\xi}l(n)$ is an estimated channel of $n^{th}$ symbol.

The channel estimation value calculated by the formula 2 is a weighted average on the basis of the weights $\beta m$ which becomes smaller, as the sample points go far from an observation timing. 160 samples around the point of notice are employed in Reference 2.

However, in the formula 1 for obtaining the characteristics of a transmission channel in the linear approximation, the sample points are not given weights depending upon the time difference from the observation timing.

Further, the formula merely calculates an average of the channel estimation value, although the sample points are given weights depending upon the time difference from the observation timing.

When the channel characteristics fluctuate rapidly, the linear approximation by formula 1 is more precise than the average by the formula 2. However, it is better to give less weight to the sample points which are far from the observation point, because the channel characteristics are time-dependent.

Unfortunately, it is not yet known how to vary the weights in formula 1 on the basis of the time difference from the observation timing.

Furthermore, memories sufficient to store 150 to 160 sample points and data processing capacity are required, because both the formula 1 and formula 2 employ as many samples in order to reduce an effect by noise.

SUMMARY OF THE INVENTION

Therefore, an object of the present invention is to provide a circuit which estimates the characteristics of a transmission channel in linear form, taking into consideration the time difference of sample points from observation timing.

Another object of the present invention is to reduce memory capacity and load of data processing for estimating the channel characteristics.

In the channel characteristics estimation apparatus of the present invention, an inclination and bias in the channel characteristics are calculated under 1st order approximation for every time slot. Then, the inclination parameter is processed by low pass filter, and the bias parameter is compensated on the basis of the compensated inclination parameter.

Such a low pass filtering makes it possible to estimate the channel characteristics on the basis of the time differences of the sample points. Further, above-mentioned calculation on the time slot basis makes it possible to reduce memory capacity and processing steps.

According to the present invention, a first order approximation of channel characteristics on the basis of the weights corresponding to the time differences of sample points from observation timing can be obtained, because the estimated inclination b (k) in the channel characteristics estimated slot by slot by the 1st order approximation is processed by a recursive low pass filter.

Further, according to the present invention, the memories and calculation steps required for estimating the channel characteristics are reduced, because the data are processed on the slot by slot basis.

BRIEF EXPLANATION OF THE DRAWINGS

FIG. 2 is a block diagram of an example of the low pass filter as shown in FIG. 1.

PREFERRED EMBODIMENT OF THE INVENTION

Figure 1:
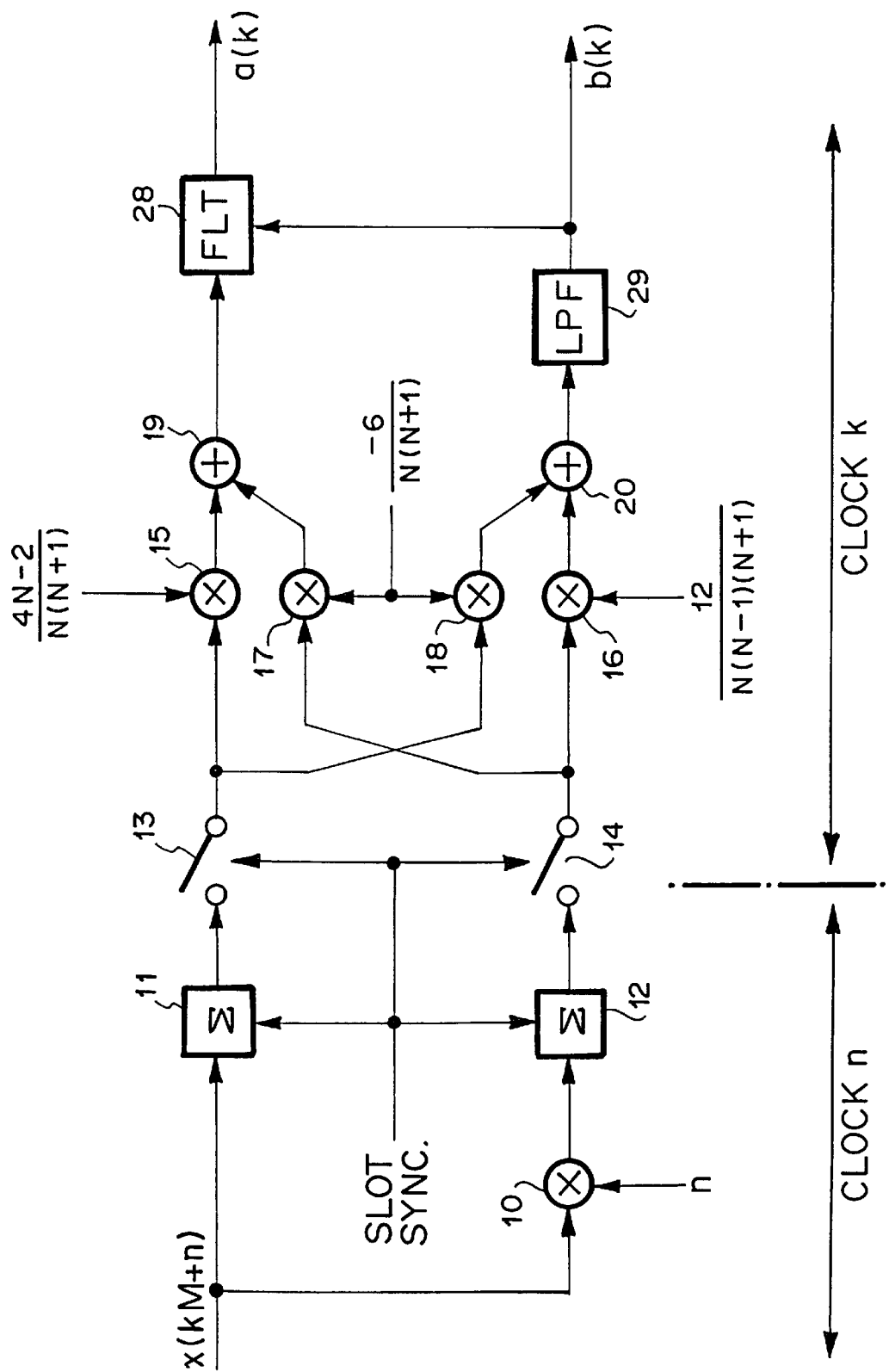
FIG. 1 is a block diagram of the channel characteristics estimation apparatus of the present invention.

Preferred mode of embodiment of the present invention is explained in detail, referring to the drawings.

A block diagram of a channel characteristics estimation apparatus of the present invention is shown in FIG. 1.

Pilot signal x (kM+n) is detected by matched filter as shown in FIG. 1. Here, M is a number of samples per time slot, k is a slot number, and n (n=0,1, . . . , M−1) is a sample number in time slot.

Adder 11 adds detected x (kM+n) slot by slot, while adder 12 adds n×(x(kM+n)) slot by slot.

Adders 11 and 12 add N samples. Here, the first N (N≦M) samples are provided for pilot signal in every time slot.

Switches 13 and 14 turns on every time slot for sampling the outputs from adders 11 and 12.

Further, multiplier 15 multiplies the output from switch 13 by (4N−2)/(N(N+1)). Multiplier 16 multiplies the output from switch 14 by (12)/(N(N−1)(N+1)). Multiplier 17 multiplies the output from switch 14 by (−6)/(N(N+1)). Multiplier 18 multiplies the output from switch 13 by (−6)/(N(N+1)).

Further, adder 19 adds the output from multiplier 15 and the output from multiplier 17, while adder 20 adds the output from multiplier 16 and the output from multiplier 18.

Low pass filter 29 outputs the low frequency component of the output from adder 20. Bias compensation means 28 compensates the output from adder 19 on the basis of LPF 29.

The output a (k) from bias compensation means 28 is a bias value of the channel characteristics of a slot, while the output b (k) from LPF 29 is an inclination value of the channel characteristics of the slot. Therefore, an estimated value of the channel characteristics is:

$$n \times b(k) + a(k).$$

An example of LPF 29 as shown in FIG. 1 is shown in FIG. 2.

Adder 21 adds the output from adder 20 and the output from multiplier 24. Multiplier 22 multiplies the output from adder 21 by $1/(1+\alpha^2)^{1/2}$.

Delay circuit 23 delays the output from multiplier 22, and multiplier 24 multiplies the output from 23 by the factor $\alpha$. The output from multiplier 22 is outputted from LPF 29.

Figure 3:
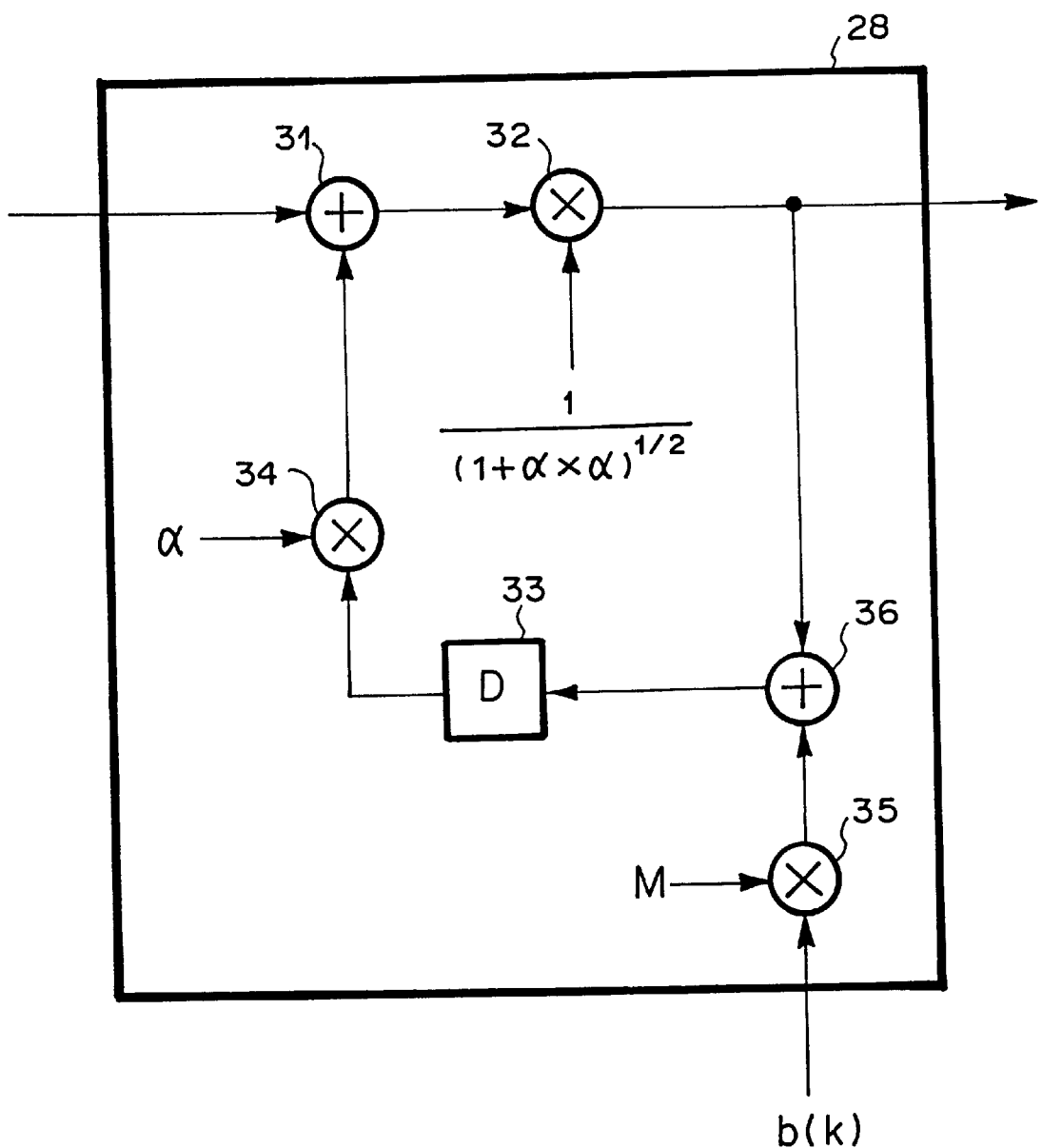
FIG. 3 is a block diagram of an example of the bias compensation means as shown in FIG. 1.
Figure 4:
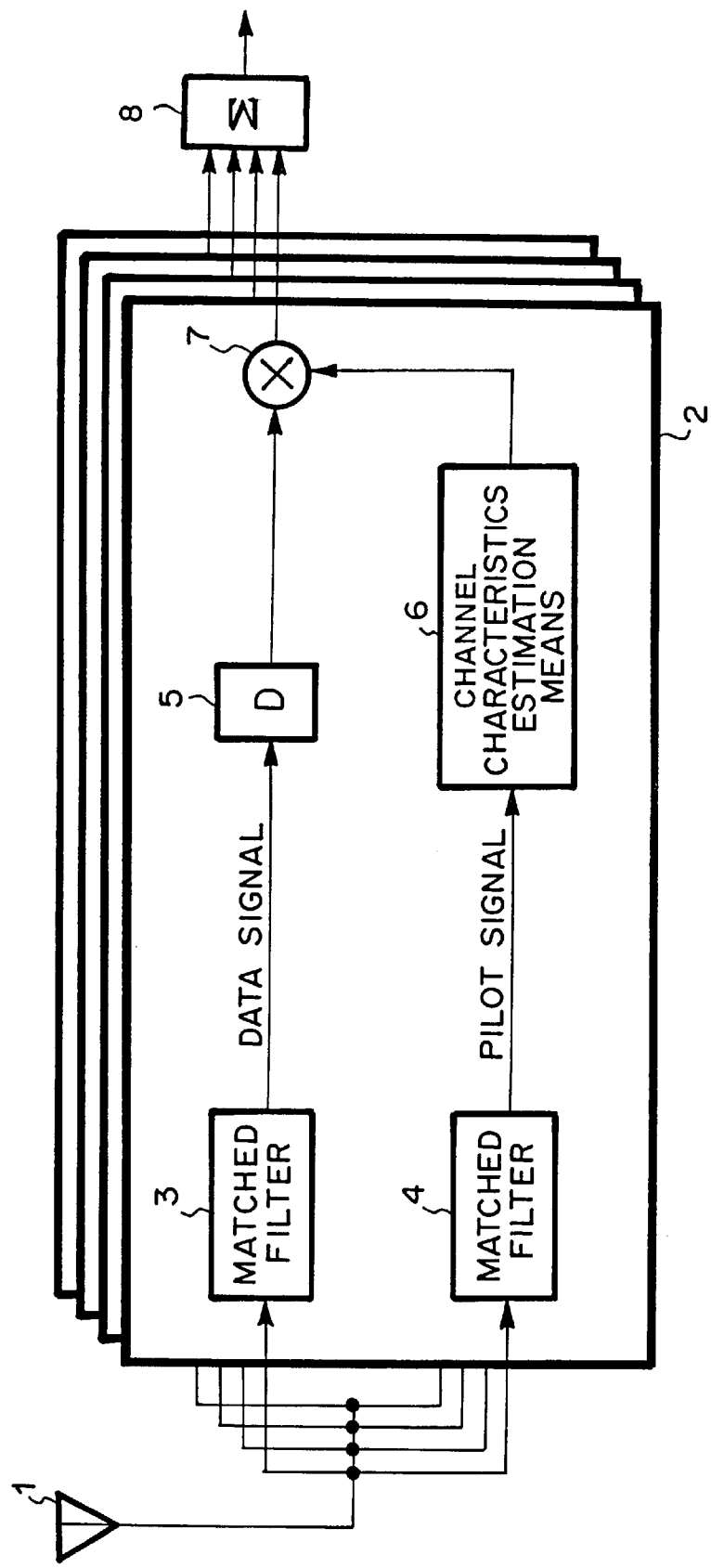
FIG. 4 is a block diagram of an example of CDMA receiver for detecting pilot signals.
Figure 5:
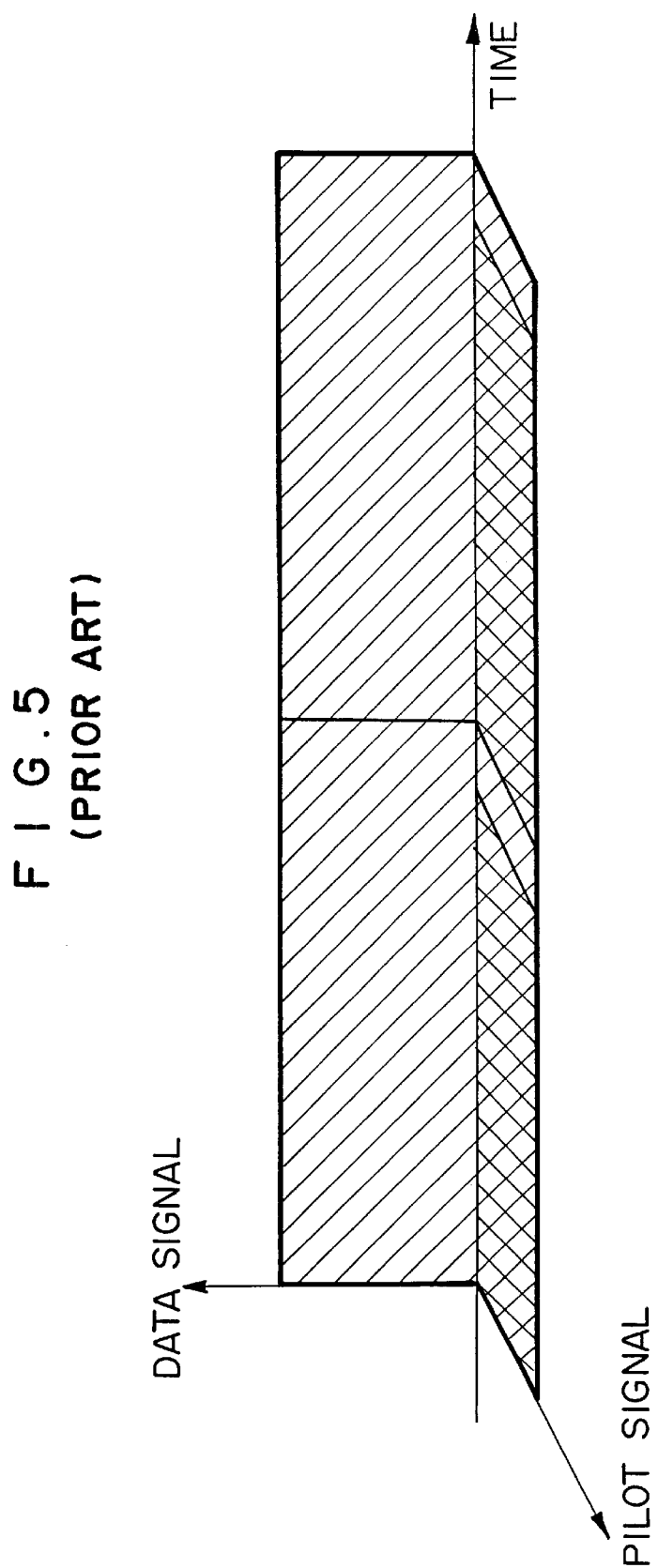
FIG. 5 is an illustration of pilot signal and data modulated in I-Q plane.
Figure 6:
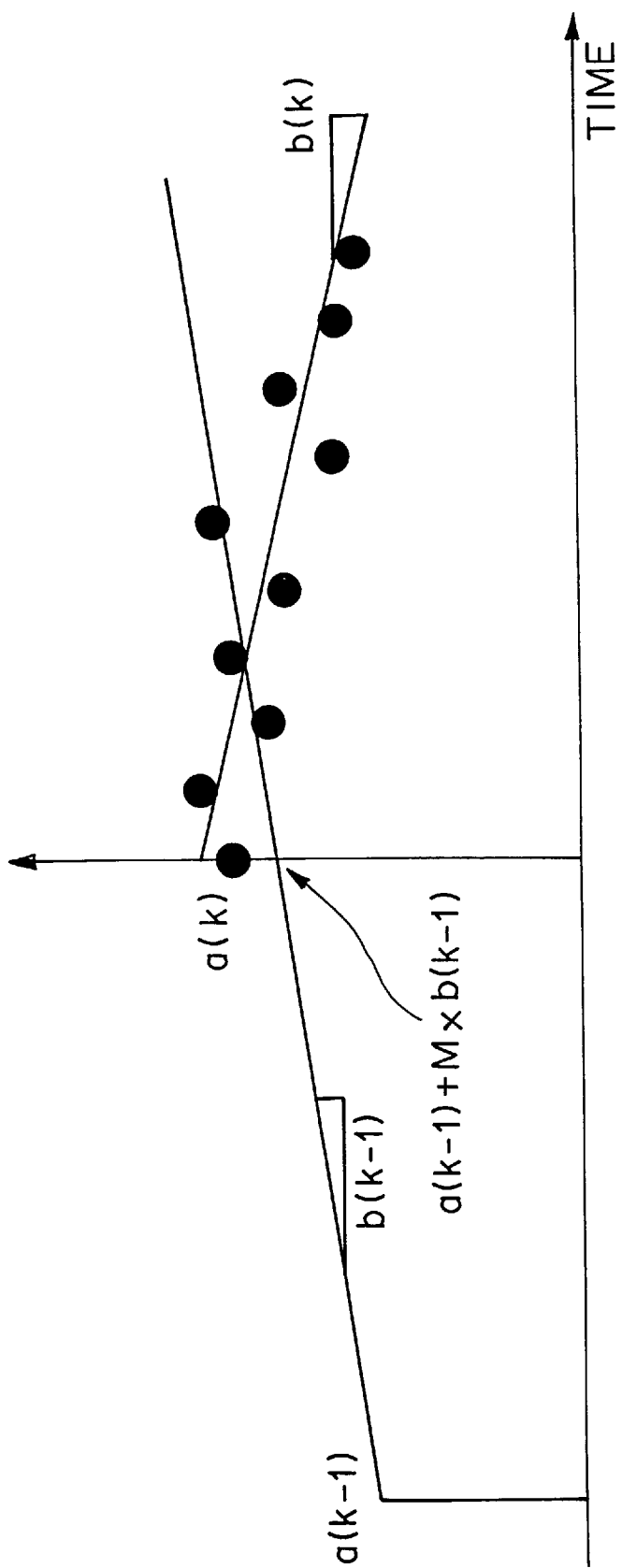
FIG. 6 is an exemplary graph for explaining the $1^{st}$ order approximation of the channel characteristics.

Bias compensation means as shown in FIG. 1 is shown in FIG. 3.

Adder 31 adds the output from adder 19 and the output from multiplier 34. Multiplier 32 multiplies the output from adder 31 by $1/(1+\alpha^2)^{1/2}$.

Delay circuit 33 delays the output adder 36 by the time period of one time slot. Then, multiplier 34 multiplies the output from delay circuit 33 by the positive parameter $\alpha$. Multiplier 35 multiplies the output b (k) from LPF 29 by the sample number M per slot. Adder 36 adds the output from multiplier 32 and the output from multiplier 35. Finally, The output from multiplier 32 is outputted from bias compensation means 28.

The multiplication factors in multipliers 15 to 17 are determined by the formula 3 in reference 1. These factors are used to accomplish the 1st order approximation in each slot.

The formula 3 is $$\begin{bmatrix} \frac{Ne(Ne-1)(2Ne-1)}{6} & \frac{Ne(Ne-1)}{2} \\ \frac{Ne(Ne-1)}{2} & Ne \end{bmatrix} \begin{bmatrix} \alpha \\ \beta \end{bmatrix} = \begin{bmatrix} \sum_{i=0}^{Ne-1} iX((n-i)Tb) \\ \sum_{i=0}^{Ne-1} X((n-i)Tb) \end{bmatrix},$$

wherein Ne is a number of taps, Tb is a time period of one bit, X(nTb) is a base-band signal obtained by correlation detection, a(nTb) is an estimated X(nTb)), and $\alpha i+\beta=a((n-1)Tb)$. The data processing steps are reduced, because these multipliers are used only once per slot.

The feed-back path by delay circuit 23 and multiplier 24 is a 1st order recursive filter, so that the noise of the inclination b (k) of the channel characteristics can be eliminated by using fewer memory and calculation steps.

The feedback path including delay circuit 23 and multiplier 24, or the feedback path including delay circuit 33 and multiplier 34, may be replaced by a higher order filter with increased number of taps, or a non-recursive filter. M×b (k) is introduced in multiplier 35 in order to obtain a bias value at an end point of time slot.

What is claimed is:

1. A channel characteristics estimation apparatus wherein an inclination and bias of said channel characteristics are estimated by receiving a pilot signal which contains N samples in a time slot, which comprises:
   a first adder for adding said samples every said time slot;
   a second adder for adding said samples multiplied by its sampling position number every said time slot;
   a third adder for adding the output from said first adder multiplied by (4N−2)/(N(N+1)) to the output from said second adder multiplied by (−6)/(N(N+1));
   a forth adder for adding the output from said first adder multiplied by (−6)/(N(N+1)) to the output from said second adder multiplied by (12)/(N(N−1)(N+1));
   a low pass filter for filtering the output from said forth adder and for outputting said inclination; and
   a compensation means for compensating the output from said third adder and for outputting said bias.

2. The channel characteristics estimation apparatus according to claim 1, wherein said low pass filter is a recursive filter.

3. The channel characteristics estimation apparatus according to claim 1, wherein said compensation means comprises:
   a first multiplier for multiplying the output from said low pass filter by M, where M is a number of total samples in said time slot;

a fifth adder for adding the output from said compensation means to the output from said first multiplier;

a delay circuit for delaying the output from said fifth adder;

a second multiplier for multiplying the output from said delay circuit by factor $\alpha$;

a sixth adder for adding the output from said third adder to the output from said second multiplier; and a third multiplier of which output is the output from said compensation means, for multiplying the output from said sixth adder by another factor $(1/(1+\alpha^2)^{1/2}.)$ 4. A radio receiver for receiving a pilot signal and data signal carried by the quadrature modulation, which includes a channel characteristics estimation apparatus, wherein an inclination and bias of said channel characteristics are estimated by receiving a pilot signal which contains N samples in a time slot, which comprises:

a first adder for adding said samples every said time slot;

a second adder for adding said samples multiplied by its sampling position number every said time slot;

a third adder for adding the output from said first adder multiplied by $(4N-2)/(N(N+1))$ to the output from said second adder multiplied by $(-6)/(N(N+1))$;

a forth adder for adding the output from said first adder multiplied by $(-6)/(N(N+1))$ to the output from said second adder multiplied by $(12)/(N(N-1)(N+1))$;

a low pass filter for filtering the output from said forth adder and for outputting said inclination;

a compensation means for compensating the output from said third adder and for outputting said bias.

5. A channel characteristics estimation method wherein an inclination and bias of said channel characteristics are estimated by receiving a pilot signal which contains N samples in a time slot, which comprises the steps of:

adding said samples every said time slot, by means of a first adder;

adding said samples multiplied by its sampling position number every said time slot, by means of a second adder;

adding the output from said first adder multiplied by $(4N-2)/(N(N+1))$ to the output from said second adder multiplied by $(-6)/(N(N+1))$, by means of a third adder;

adding the output from said first adder multiplied by $(-6)/(N(N+1))$ to the output from said second adder multiplied by $(12)/(N(N-1)(N+1))$, by means of a forth adder;

filtering the output from said forth adder and for outputting said inclination, by means of a low pass filter; and compensating the output from said third adder and for outputting said bias, by a compensation means.

6. The channel characteristics estimation method according to claim 5, wherein said low pass filter is a recursive filter.

7. The channel characteristics estimation method according to claim 5, wherein said compensating step comprises:

multiplying the output from said low pass filter by M, where M is a number of total samples in said time slot, by means of a first multiplier;

adding the output from said compensation means and the output from said first multiplier, by means of a fifth adder;

delaying the output from said fifth adder, by means of a delay circuit;

multiplying the output from said delay circuit by a factor $\alpha$, by means of a second multiplier;

adding the output from said third adder to the output from said second multiplier, by means of a sixth adder; and multiplying the output from said sixth adder by another factor $(1/(1+\alpha^2)^{1/2})$, by means of a third multiplier of which output is the output from said compensation means.

* * * * *